United States Patent Office 3,194,764
Patented July 13, 1965

3,194,764
BLENDED ESTER LUBRICANT
Elwin B. Ovist, Park Forest, Ill., and Manley Kjonaas, Hammond, Ind., assignors, by mesne assignments, to Sinclair Research Inc., New York, N.Y., a corporation of Delaware
No Drawing. Filed Feb. 13, 1959, Ser. No. 792,955
4 Claims. (Cl. 252—56)

This application is a continuation-in-part of our application Serial No. 719,760, filed March 7, 1958, now abandoned.

This invention relates to a process for the preparation of complex esters having improved viscosity characteristics and low acid number, to the complex esters produced by this process and to a synthetic lubricant containing a diester blended with this complex ester.

In an effort to obtain superior lubricating compositions having specific and unusual characteristics new synthetic lubricants have been developed. In general, these lubricating compositions are characterized by higher viscosity indices, lower pour points and greater oxidative stability than mineral oils of corresponding viscosity at ordinary temperatures. Such properties are of special value in the lubricating of engines which are subjected to high temperatures such as combustion turbine engines, which also frequently must start up under extremely low atmospheric temperature conditions. Mineral oil lubricants containing added viscosity index improvers, pour point depressors, or other additives are undesirable for use in such engines because of their volatility, low flash point, and tendency to leave a residue which accumulates and interferes with the operation of the engine.

Various esters such as castor oil have been used as lubricants. In addition, synthetic diesters, formed by the reaction of a dibasic acid with a mono-hydroxy alcohol, are known to possess good viscosity-temperature curves and low pour points. Examples of diesters which have attained some commercial use as lubricants are di-2-ethylhexyl sebacate and di-isooctyl azelate. Diesters, however, having a satisfactory viscosity range and other suitable properties cannot be made from readily available materials.

In an effort to overcome some of these difficulties complex esters of the type X—Y—Z—Y—X in which X represents a mono-alcohol residue, Y represents a dicarboxylic acid residue and Z represents a glycol residue and the linkages are ester linkages, have been developed. These esters have been found to be especially adaptable to the conditions to which turbine engines are exposed, since they can be formulated to give a desirable combination of high flash point, low pour point, and high viscosity at elevated temperatures, and need contain no additives which might leave a residue upon volatilization. In addition, many complex esters have shown good stability to shear.

In order to achieve the most desirable viscosity characteristics complex esters are frequently blended with diesters to produce lubricating compositions of wide viscosity ranges which can be "tailor made" to meet various specifications. Some recent specifications such as the Allison EMS-35E specification have more stringent requirements than others which have been met heretofore by blended ester type lubricants. The Allison specification viscosity requirements are a maximum of 13,000 centistokes at —40° F. with a desired minimum viscosity of 7.5 centistokes at 210° F. These properties are best obtained by blending a more viscous ester in a less viscous diester such as di-2-ethylhexyl sebacate or diisooctyl azelate. The ester to be used as the thickening agent must be thermally as well as shear stable. Complex esters of the X—Y—Z—Y—X type mentioned above best fulfill these requirements.

The complex ester derived from the reaction of approximately one mole of neopentyl glycol, two moles of azelaic acid and two moles of isooctyl alcohol is of particular interest because of the thermal stability of the ester linkages involving the glycol and the low cost and ready availability of the raw materials. However, it has not been possible to manufacture suitable azelaic acid based complex esters by the use of conventional esterification catalysts such as sodium acid sulfate or paratoluene sulfonic acid. The complex esters prepared by conventional means have a kinematic viscosity of about 7.5 centistokes at 210° F. and 14,500 to 15,000 centistokes at —40° F. Obviously, these complex esters could not be blended with a lighter diester to yield fluids having the desired viscosities.

This invention produces complex esters and diesters which may be blended to give lubricant fluids which meet the Allison specifications outlined above. In this production the starting materials and processing steps have been found to be interrelated so that each component and step must be selected to produce satisfactory materials efficiently. The method of preparing complex esters affects the viscosities and ASTM slopes of these esters. Specifically, the use of a heavy metal-containing catalyst or accelerator, and stripping of water, unreacted constituents and light ends, preferably under special conditions, after the esterification is completed, results in a complex ester having a significantly higher viscosity and lower ASTM slope than the same complex esters prepared by the use of conventional acidic esterification catalysts. The stripping usually requires a temperature higher than the boiling point, at the reduced pressure (up to about 25 mm., preferably about 1–10 mm. Hg absolute) which prevails during this stripping step, of any simple diester component formed. Generally, the temperature is above 175° C. It usually will range up to about 200 to 250° C. or to just below the decomposition point of the ester. Preferably the stripping temperature is at least about 190° C. The superior viscosity characteristics of the complex esters of this invention allow these esters to be used as thickening agents in the formulation of certain synthetic lubricants which could otherwise not be practically made.

The catalysts or accelerators used in the esterification process of this invention are the organic and inorganic compounds of titanium, particularly the oxides, halides, including the oxyhalides, and esters. Organo-titanates and titanium chlorides and oxychlorides have been found to be effective esterification catalysts to provide the proper viscosity and acid number in the finished complex ester.

Esters used for lubrication require low acid numbers if they are to pass standard corrosion tests. With the use of many catalysts, however, substantial free acid remains and an after treatment is usually required to reduce the acid number to desired levels. Such a treatment may be, for example, an aqueous base wash, as with a 5% aqueous $K_2CO_3$ solution, or a more elaborate treatment such as with propylene oxide in an autoclave at about 180° C. and 100 p.s.i.g. for about 7 or 8 hours combined with subsequent flashing off of excess propylene oxide at about 350° F. However, when Ti compounds are used for the esterification, the reaction not only proceeds faster than with other catalysts but also the products are of low acid number, for example, below about 0.25, without giving the ester products any special treatment to reduce the acid number.

Suitable titanium esters for use as catalysts, made by reacting aliphatic alcohols with titanium tetrachloride are availablbe commercially. The alcohol component, whether monohydric or polyhydric, usually has from 1–20 carbon atoms, preferably 3–12 carbon atoms. Glycol esters, for example, glycol titanates are obtained when the simple ester is reacted with a glycol. The glycol titanates which may be used in this invention are obtained when a titanium tetratester is reacted with a glycol. These catalysts are either liquid or solid and are compatible (soluble, miscible or dispersible) with the ester and alcohol reactants at least in the catalytic amounts used. There is some question as to the structure of the glycol-derived, titanium-containing catalysts and they may be made from materials other than the tianitum tetraesters and glycols. The titanate products we find useful may be monomers or polymers, and if desired, the glycol titanates ccan be water-washed to approach a water-insensitive form. At least certain of the glycol titanates are chelated and have a coordinate valence bond between an oxygen and a titanium atom.

Generally, the mere combination of a titanium tetraester and a glycol initiates an exothemric reaction, although, if desired, heating can be employed. The initial reaction may proceed only to the monomer stage or continue to a polymer product directly. If a monomer or partially polymerized product be first obtained it can be further polymerized. In any event, the various monomeric or polymeric products afforded can be employed, including the partial polymers, which range from viscous liquids to solids, and are useful in the reaction system.

Among the titanium esters which can be used as the catalysts or employed for reaction with the glycol are alkyl titanates such as methyl, ethyl, propyl, butyl, 2-ethylhexyl, dodecyl, cyclohexyl and ethoxyethyl tetraesters; aryl tetraesters such as phenyl and beta-naphthyl tetratitanates; aralkyl esters such as benzyl tetratitanate; mixed esters including diethyl diphenyl tetratitanates; mixtures of these materials, and their condensed or polymeric organic titanates. The various esters can be substituted in the hydrocarbon ester group although the unsubstituted esters are preferred. The esters prepared from monohydroxy alcohols are used most advantageously. Ordinarily, the sepaarte organic radicals of the titanium tetraester will contain up to about 12 to 20 carbon atoms but may contain more if desired.

The catalysts or accelerators are preferably the products obtained through the reaction of the titanium tetraester with a glycol of the 1,3-diol type (see U.S. Patent No. 2,643,262) or are derived from these products. As set forth in the patent, these glycols are 2,3-diorgano hydrocarbon substituted materials which have the formula $$\text{R—CHOH—CH—CH}_2\text{OH}$$
$$\text{\textbar}$$
$$\text{R}'$$

The diorgano radicals, that is the R and R' of the glycol formula, can be alkyl, aryl or mixed, and, if desired, be substituted as with halogen, for instance chlorine. Generally, these glycols contain from about 5 to 12 carbon atoms; however, if desired they could contain a greater number. Among the specific glycols which can be employed are 2-ethyl-1,3-hexanediol, 2-propyl-1,3-heptanediol, 2 - methyl-1,3-pentanediol, 2-butyl-1,3-butanediol, 2,4-diphenyl-1,3-butanediol, and 2,4-dimesityl-1,3-butanediol.

In addition to these glycols the catalysts can be prepared from others and generally the glycols will contain from 2 to 20 carbon atoms or more. Also, as indicated above, the glycols may be unsubstituted or substituted as with halogen or another hydroxy radical. Others of the glycols which can be used are ethylene glycol, 2,3-butanediol and ether polyalkylene glycols, for instance where the alkylene radical contains 2 to 4 carbon atoms such as diethylene glycol and dipropylene glycol.

The various structures of these products have not been ascertained. The configuration of these products has been considered in U.S. Patent No. 2,643,262 and in copending application Serial No. 647,511, filed March 21, 1957. The portions of this application which are pertinent to the possible structures of the catalyst or accelerator used in the process of this invention are incorporated herein. It is preferred to employ the titanium ester-glycol reaction products which are relatively insensitive to water and these are obtained either by reacting the titanium tetraester with sufficient glycol to occupy all of the titanium valences, or by using a lesser amount of glycol and water washing the product so that any ester group of the original titanium tetraester remaining is replaced by a hydroxyl radical.

In spite of the uncertainties of the structures of the catalysts prepared from the titanium tetraesters and glycols, the compatible titanium compounds can be produced through reaction, with or without heating, of about ½ to 4 moles of glycol with each mole of titanium tetraester, preferably about 2 to 4 moles of glycol per mole of titanium tetraester. The first product obtained in the reaction, if it is a monomer or partial polymer, although it may be used in this process, can be polymerized through heating or through water addition and heating, with there being no particular critical limitation on either, except, of course, the temperature should not be so high as to decompose the desired reaction products. Ordinarily, the polymerization temperature will be above about 25° C. and preferably at least about 40° C. When employing heat to obtain a polymer in the absence of water and from a monomer dissolved in a solvent, it may be desirable to use a vacuum say about 5 to 10 mm. Hg and a temperature of about 130 to 170° C. to remove the solvent while forming the polymer. Other conditions of temperature and pressure could be employed. Among the suitable inert solvents which can be employed are cyclohexane, n-butane, benzene, etc. If water be present during polymerization at least one part per part of titanium tetraester is usually employed with two to twenty parts of water being used most advantageously. At the end of the reaction, alcohol and water can be boiled off or otherwise removed. The length of time the heating is conducted can be varied widely and is not critical, and apparently during polymerization non-chelated groups of the titanium reactant are hydrolyzed from the molecule.

The following table describes several suitable titanium-containing materials prepared from a titanium tetraester and a glycol. These commercially available products can be polymerized to give the catalysts or accelerators useful in the process of this invention, or may be used per se.

TABLE I.—REACTANTS

| Octylene Glycol Titanates | Molar Proportions | | Solvent, Approx. percent | Appearance |
|---|---|---|---|---|
| | Octylene Glycol [1] | Tetrabutyl Titanate | | |
| OGT-21 | 2 | 1 | 40 Butanol | Solid. |
| OGT-2.21 | 2.2 | 1 | ---do--- | Tacky-solid. |
| OGT-31 | 3 | 1 | ---do--- | Liquid. |
| OGT-41 | 4 | 1 | ---do--- | Do. |
| OGT-21 (washed) | 2 | 1 | 50 Cyclohexane | Solid. |
| OGT-2.21 (washed) | 2.2 | 1 | ---do--- | Tacky-solid. |

[1] 2-ethyl-1,3-hexanediol.

Frequently the polymeric titanium catalyst will have a molecular weight from about 800 to 3000 and preferably from about 1000 to 1800 but the molecular weight may even be as high as 5000 to 10,000 or more. Advantageously, the low molecular weight polymers are employed. The low molecular weight OGT-derived polymers frequently have viscosities at 100° F. ranging from about 0.575 to 0.85 centistokes on the basis of one gram in 40 grams of toluene.

The amount of catalyst or accelerator employed in the process of this invention is sufficient to obtain a substantial catalytic effect and generally is in the range of about 0.05 to 5 weight percent of the alcohol and acid reactants with about 0.5 to 2 weight percent being preferred. The catalyst may preferably be added as a liquid by mixing it with a liquid which is compatible with it as well as with the reactants. For instance, a solution consisting of equal amounts of 2-ethylhexyl sebacate and the polymer formed by the hydrolysis of tetra-(2-ethyl-1,3-hexanediol)-titanate has been successfully used in the process of this invention to produce complex esters of suitable viscosity characteristics.

The following examples illustrate suitable methods of preparing the organo-titanium chelate polymers.

*Example I*

One part of OGT-41 was heated at 85° C. with four parts of water. The reaction was continued for about 100 minutes and under these conditions a white elastic titanium polymer was formed. The solid polymer was separated from the liquid phase and dried and the polymer analyzed:

| Component: | Weight percent |
|---|---|
| Titanium | 16.50 |
| Carbon | 50.85 |
| Hydrogen | 9.35 |
| Ash | 29.48 |

One gram of this polymer in 40 cc. of toluene had a viscosity at 100° F. of 0.5798 centistoke.

*Example II*

One hundred grams of OGT-21 were placed in a 600 ml. Pyrex beaker. One hundred grams of water were added and these materials were agitated at 25° C. for 5 minutes. The water and alcohol were then removed from the solid white titanium polymer by filtration through a glass filter. The dried polymer analyzed:

| Component: | Weight percent |
|---|---|
| Titanium | 7.31 |
| Carbon | 54.34 |
| Hydrogen | 10.66 |
| Ash | 12.2 |

*Example III*

One hundred grams of washed OGT-21 were combined with 100 grams of water and heated in a 600 ml. Pyrex beaker for about two hours at 80° C. Under these conditions a white titanium polymer slowly formed as an insoluble product. The product was filtered from the solvent through a glass filter and the dried polymer analyzed:

| Component: | Weight percent |
|---|---|
| Titanium | 13.1 |
| Carbon | 46.28 |
| Hydrogen | 9.41 |
| Ash | 21.9 |

The complex esters of this invention, comprise the residues of two moles of a monohydric alcohol, two moles of a dicarboxylic acid and one mole of neopentyl glycol joined by ester linkages. The dicarboxylic acid is preferably azelaic acid for reasons of economy, but a mixture of azelaic acid with sebacic acid containing up to about 90% sebacic acid may also be used. The Allison specification is more difficult to meet as the amount of azelaic acid increases and it is particularly so when the azelaic acid is at least about 40% or even at least about 75% of the dibasic acids of the complex ester that the use of the titanium catalyst with our stripping procedure is important. The monohydric alcohol may be any primary branched chain $C_8$ to $C_{10}$ alcohol, advantageously having at least 2 side chains. 2-ethyl hexanol 2,4,4-trimethylpentanol and isodecanol are useable and isooctanol is preferred. Iso-octanol and iso-decanol are alcohol mixtures made by the Oxo process from $C_3$–$C_4$ olefin copolymers. The cut which makes up iso-octanol usually contains about 17 percent 3,4-dimethylhexanol; 29 percent 3,5-dimethylhexanol; 25 percent 4,5-dimethylhexanol; 1.4 percent 5,5-dimethylhexanol; 16 percent of a mixture of 3-methylheptanol and 5-methylheptanol; 2.3 percent 4-ethylhexanol; 4.3 percent $\alpha$-alkylalkanols and 5 percent other materials. Where azelaic acid is used without mixture with another acid, the complex ester has been found to have superior corrosion resisting characteristics. In order for synthetic lubricants to meet certain specifications regarding the corrosive effect which the lubricants have upon metals with which they come into contact in actual use, it has been found advantageous to formulate the lubricant so that it contains up to about 0.05 percent free acid to prevent lead corrosion by the fluid. This free acid content, however, usually worsens the panel coking of the lubricant. But when the complex ester component of the lubricant is made from 100 percent azelaic acid, no execessive corrosive effect on lead or panel coking was observed despite the presence of 0.01 percent free dibasic acid.

PREPARATION OF COMPLEX ESTERS

The complex esters are prepared by reacting together the proper proportions of glycol, dibasic acid and monohydric alcohol at a temperature of about 100 to 190° C. in the presence of the catalyst and also, preferably, an entraining agent.

The complex esters are made by either a one-stage or a two-stage reaction. In method I, about one mole of glycol, about 2 moles of the dicarboxylic acid, or mixture of acids, about 2 moles of the monohydroxy alcohol and about 0.05 to 0.5 percent of the catalyst based on the total weight of reactants are added to just enough solvent or water-entraining agent, such as xylene or toluene, to dissolve the soluble components. This mixture is reacted, preferably in an apparatus fitted with a water trap and a reflux condenser at a temperature of about 100 to 140° C., when using toluene, or even up to about 195° C. when xylene is employed, and the reaction continued under reflux until the theoretrical amount of water is collected.

In method II, about two moles of monohydroxy alcohol and about 2 moles of the dicarboxylic acid or mixture of dicarboxylic acids are reacted at a temperature between about 100 and 190° C. while refluxing in the presence of the solvent, or water-entraining agent, and about 0.05 to 0.5 percent of the catalyst based on the total weight of the reactants to be used. When water ceases to be collected in the trap, about one mole of glycol is added and the reaction is resumed. This reaction, too, is terminated when no more water is collected.

After the complex ester is prepared by either of these variations, the complex ester can be "capped" by the addition of a 10 percent excess of a monohydric alcohol which may be the same alcohol used in the esterification, or a different one. The reaction conditions are resumed and continued until once again water ceases to be evolved.

The process of this invention produces a complex ester from which the catalyst or accelerator is substantially removed. During the later stages of the capping step, the titanium catalyst precipitates in an insoluble form which may be filtered from the product. This precipitation may remove up to 90 percent of the titanium from the ester and generally signals the completion of the esterification. Additional catalyst may be removed by contacting the ester with activated Attapulgus clay.

STRIPPING

It is conventional in the manufacture of complex esters to subject the product, after capping, to filtration to remove insoluble materials. After this it is also conventional to subject the product to a reduced pressure distillation or stripping at 100 to 200° C. to remove volatile materials, such as water, the solvent, and light ends.

It has been found, however, that when titanium compound is used in the esterification certain modifications of the conventional stripping procedure will improve the final properties of the ester: if the stripping is performed at a temperture above about 175° F., e.g. about 190 to 250° C. and a pressure of up to about 25 mm. of Hg for about ½ to 4 hours the viscosity of the final complex ester is improved. A temperature of about 200° C. at about 5 to 10 mm. Hg for two hours has proven to be successful for the viscosity improvement. 225° C. is a preferred up limit on the temperature.

PREPARATION OF LUBRICANT BLENDS

The diesters of lubricating viscosity with which this complex ester is blended are of the type alcohol-dicarboxylic acid-alcohol. The alcohol component is again selected from the primary branched chain $C_8$ to $C_{10}$ alcohols as noted above. The dicarboxylic acid may be azelaic, sebacic or any mixture of the two. Preferably it is azelaic, which is less costly.

Di-2-ethylhexyl sebacate (Plexol 201) and diisooctyl ($C_8$ oxo-alcohol) azelate (DiOAz) are both economically attractive and readily available with properties particularly satisfactory for use with the complex ester produced by the process of this invention.

The diester is blended with the complex ester by stirring together a quantity of diester and complex ester at an elevated temperature, altering the proportions of each component until the desired viscosity is reached. For example, when a lubricant is to be made which meets the Allison specification given above, a batch of the complex ester is heated to about 210° F. and diester is added slowly to the heated mass, maintaining the temperature until a kinematic viscosity of about 7.5 cs. is indicated. The finished blend will usually contain about 70 to 85 percent of the complex ester. Thus the diester will be about 15 to 30 percent of the blend. The blend can also include up to about one percent by weight of an oxidation inhibitor, such as phenothiazine and may also contain a foam inhibitor such as "DCF" or other additives to provide a particular characteristic. "DCF" is a liquid methyl silicone polymer having a viscosity of 60,000 at 25° C. The blend also may contain up to about 0.05% free dicarboxylic acid, e.g., an aliphatic acid of 6 to 12 carbon atoms, to improve its corrosion characteristics.

The following are specific examples of the use of the process of this invention and the product produced thereby. These examples are to be considered as illustrative only and not limiting.

Example IV

To illustrate the ineffectiveness of a conventional esterification catalyst in producing a complex ester of suitable viscosity characteristics, 376 g. (2 M) of azelaic acid, 104 g. (1 M) of neopentyl glycol, 260 g. (2 M) of "oxo" isooctyl alcohol, 2.1 g. (0.3%) $NaHSO_4$ and 200 g. of xylene were charged to a 2 liter, 3 necked flask equipped with a stirrer, thermometer and water trap below a reflux condenser. The reaction mixture was stirred at reflux temperature while the water of reaction was collected in the trap. After seven hours, evolution of water stopped and an additional 70 grams of isooctyl alcohol was added. After a total of 62.5 hours the reaction was stopped. The product was filtered and stripped of solvent and unreacted alcohol by heating at 200° C. over a period of two hours at 4 mm. Hg. pressure. The product had the following properties:

| | |
|---|---|
| Acid No. | 3.03 |
| K.V./100° F. cs | 39.55 |
| K.V./210° F. cs | 7.524 |
| K.V./—40° F. cs | 14,622 |

This material did not have sufficient viscosity at 210° F. to be used as a blend component.

Example V 188 g. (1 M) azelaic acid, 52 g. (0.5 M) neopentyl glycol, 130 g. (1 M) "oxo" isooctyl alcohol, 100 g. xylene and 1.8 g. $TiCl_4$ were charged to a 1 liter 4 neck flask and stirred at reflux temperature. Water was collected in a trap below the reflux condenser.

| Time, hr. | Water in Trap, cc. | Temperature, °C. |
|---|---|---|
| 1½ | 29 | 163 |
| 4½ | 34.5 | 165 |
| 7½ | 37 | 167 |

36 g. isooctyl alcohol was added and refluxing was continued.

| | | |
|---|---|---|
| 23½ | 39 | 174 |
| 30½ | 39 | 179 |

The reaction mixture had an acid number of 0.1. It was filtered and then stripped at 200° C. and 1 mm. Hg for 2 hours to give a material having these characteristics:

| | |
|---|---|
| Acid No. | 0.14 |
| K.V./100° F. cs | 50.44 |
| K.V./210° F. cs | 9.238 |

A blend of 82% of the above product in di-isooctyl azelate (DiOAz) gave a K.V. at 210° F. of 7.665 cs. and a K.V. at —40° F. of 12,607 cs.

Example VI 376 g. (2 M) azelaic acid, 104 g. (1 M) neopentyl glycol, 260 g. (2 M) "oxo" isooctyl alcohol, 150 g. xylene and 1.5 g. $ZnCl_2$ were charged to a 2 liter 4 neck flask and stirred at reflux temperature. Water was collected in a trap below the reflux condenser.

| Time, hr. | Water in Trap, cc. | Temperature, °C. |
|---|---|---|
| 8½ | 68 | 164 |

72 g. isooctyl alcohol was added and refluxing was continued.

| | | |
|---|---|---|
| 13½ | 73 | 174 |
| 29½ | 74 | 175 |
| 36 | 74 | 176 |
| 53 | 74 | 177 |

The reaction mixture was filtered and then topped to 200° C. at 1.3 mm. Hg for 2 hours to give a material having these characteristics:

| | |
|---|---|
| Acid No. | 0.66 |
| K.V./100° F. cs | 55.04 |
| K.V./210° F. cs | 9.792 |

A blend of 75% of the above product in di-isooctyl azelate (DiOAz) gave a K.V. at 210° F. of 7.532 cs. and a K.V. at —40° F. of 11,873 cs.

Example VII 376 g. (2 M) azelaic acid, 104 g. (1 M) neopentyl glycol, 26 g. (2 M) "oxo" isooctyl alcohol, 350 g. xylene and 1.5 g. $SnCl_4 \cdot 5H_2O$ were charged to a 3 liter, 4 neck flask and stirred at reflux temperature. Water was collected in a trap below the reflux condenser.

| Time, hr. | Water in Trap, cc. | Temperature, °C. |
|---|---|---|
| 3¼ | 71 | 176 |

72 g. isooctyl alcohol was added and refluxing was continued

| | | |
|---|---|---|
| 19¼ | 75 | 174 |
| 27 | 75 | 174 |
| 44¼ | 75 | 175 |

The reaction mixture was filtered and then topped to 200° C. at 1.4 mm. Hg for 2 hours to give a material having these characteristics:

Acid No. _____ 0.32
K.V. at 100° F. _____cs__ 48.89
K.V. at 210° F. _____cs__ 8.997

A blend of 83% of the above product in di-isooctyl azelate (DiOAz) gave a K.V. at 210° F. of 7.954 cs. and a K.V. at −40° F. of 12,779 cs.

*Example VIII*

376 g. (2 M) azelaic acid, 104 g. (1 M) neopentyl glycol, 260 g. (2 M) "oxo" isooctyl alcohol, 150 g. xylene and 1.2 g. dibutyl tin oxide were charged to a 2 liter 4 neck flask and stirred at reflux temperature. Water was collected in a trap below the reflux condenser.

| Time, hr. | Water in Trap, cc. | Temperature, °C. |
|---|---|---|
| 1½ | 47 | 170 |
| 3½ | 61 | 173 |
| 4½ | 64 | 175 |
| 20½ | 74 | 175 |

72 g. isooctanol was added and refluxing was continued.

| | | |
|---|---|---|
| 28½ | 77 | 176 |
| 36 | 77 | 176 |
| 52 | 77 | 176 |
| 76 | 77 | 176 |

The reaction mixture had an acid number of 0.12. It was filtered and then topped to 200° C. at 1.6 mm. Hg for 2 hours to give a material having these characteristics:

Acid No. _____ 0.53
K.V./100° F. _____cs__ 50.61
K.V./210° F. _____cs__ 9.215

A blend of 80% of the above product in di-isooctyl azelate (DiOAz) gave a K.V. at 210° F. of 7.542 cs. and a K.V. at −40° F. of 11,827 cs.

*Example IX*

1504 g. (8 M) azelaic acid, 416 g. (4 M) neopentyl glycol, 1040 g. (8 M) "oxo" isooctyl alcohol, 800 g. xylene and 15 g. tetraisopropyl titanate were charged to a 5 liter 3 neck flask and stirred at reflux temperature. Water was collected in a Dean-Stark trap below the reflux condenser.

| Time, hr. | Water in Trap, cc. | Temperature, °C. |
|---|---|---|
| 2 | 170 | 155 |
| 3½ | 223 | 159 |
| 19 | 292 | 170 |

300 g. isooctyl alcohol was added and refluxing was continued.

| | | |
|---|---|---|
| 23 | 297 | 173 |
| 27 | 297 | 173 |
| 43 | 297 | 173 |

The reaction mixture had an acid number of 0.12. It was filtered and then topped to 200° C. at 1.5 mm. Hg for 2 hours to give a material having these characteristics:

Acid No. _____ 0.13
K.V. at 100° F. _____cs 50.76
K.V. at 210° F. _____cs__ 9.202

A blend of 79% of the above product in di-isooctyl azelate (DiOAz) gave a K.V. at 210° F. of 7.50 cs. and a K.V. at −40° F. of 11,943 cs.

*Example X*

Azelaic acid, 263 pounds, 72.8 pounds of neopentyl glycol, 182 pounds of "oxo" isooctyl alcohol, 125 pounds of xylene and 5 pounds of a 30% solution of the octylene glycol titanate polymer of Example I in di-2-ethylhexyl sebacate were charged to a 200 gallon stirred kettle. The reaction mixture was refluxed over a period of 26 hours while collecting water of reaction. An additional 31 pounds of the isooctyl alcohol were added and the reaction was continued an additional 20 hours. The product was then filtered, topped at 425° F. for 3 hours at 5 mm. Hg, contacted with 2% by weight of Attapulgus clay at 230° F. for 30 minutes and filtered. The final product (411 lbs.) was light in color and had the following properties.

Acid No. _____ 0.07
K.V./210° F. _____cs__ 9.51
K.V./100° F. _____cs__ 52.71
K.V./−40° F. _____cs__ 24,400

A comparison of the acid numbers of the complex ester products of Examples V, IX and X versus Examples VI to VIII shows the desirability of employing a titanium catalyst to give the desired lower acid number.

A typical finished synthetic lubricant compounded with the azelaic acid based complex ester of Example X had the following composition:

| Component: | Wt. percent |
|---|---|
| Di-isooctyl azelate (DiOAz) | 25.5 |
| Complex ester | 74.0 |
| Phenothiazine, pur. N.F. | 0.50 |
| DCF 200–1,000,000 | 0.001 |
| Free azelaic acid | 0.01 |

Table II gives a comparison of the properties of this lubricant with those properties required by the Allison EMS–35E specification.

TABLE II

| Property | Specification | Ester Lube |
|---|---|---|
| Gravity, ° API | | 16.5 |
| Carbon residue, percent | | 0.32 |
| Sulfate ash, percent | | 0.026 |
| NPA color | | 3½ |
| Acid number | | 0.23 |
| K.V./−40° F., cs | 13,000 max | 11,820 |
| K.V./100° F., cs | | 37.80 |
| K.V./210° F., cs | 7.5 min | 7.534 |
| Viscosity index | | 151.7 |
| Pour point, ° F | −60 max | B−80 |
| Flash point, ° F | 425 min | 445 |
| Fire point, ° F | | 515 |
| Low temperature stability (−40° F. for 72 hrs.). | No gelling, crystallization, etc. | Pass |
| Corrosion and oxidation stability (347° F., 72 hrs.): | | |
| Metals, wt. change, mg./cm.²: | | |
| Copper | ±0.4 | 0.031 |
| Silver | ±0.2 | 0.015 |
| Steel | ±0.2 | 0.038 |
| Aluminum alloy | ±0.2 | 0.031 |
| Magnesium alloy | ±0.2 | 0.007 |
| | No pitting, etching or dark grey or black deposits. | |
| Used oil tests: | | |
| Viscosity at 100° F., percent change. | −5 to +12 | 7.65 |
| Acid number increase | 1.5 max | 1.2 |
| Panel coking, 600° F., mg. gain | 150 max | 65 |
| Foam test: | | |
| Sequence I | 100-0-5′ | 10-0-2″ |
| Sequence II | 25-0-3′ | 20-0-9″ |
| Sequence III | 100-0-5′ | 0-0-0 |
| Ryder gear test, lbs./in. of tooth face width. | 3,000 min | 3,040, 3,220 |
| S.O.D. lead corrosion, mg./in.² (325° F. 1 hr.). | −6.0 max | 0.511 (Pb) −0.067 (Cu) |
| Evaporation, percent loss (400° F. 6.5 hrs.). | | 10 |

Table III discloses other examples of complex esters made by the use of a titanium catalyst according to the process of this invention. The "polymer" used is the titanium polymer of Example I.

TABLE III

| Sample Number | XI | XII | XIII | XIV | XV | XVI | XVII | XVIII |
|---|---|---|---|---|---|---|---|---|
| Molar ratio of reactants: | | | | | | | | |
| Sebacic acid | | 1.4 | 1.6 | | 1.0 | 1.6 | 1.6 | 1.6 |
| Azelaic acid | 2.0 | 0.6 | 0.4 | 2.0 | 1.0 | 0.4 | 0.4 | 0.4 |
| Neopentyl glycol | 1.0 | 1.0 | 1.0 | 1.0 | 1.0 | 1.0 | 1.0 | 1.0 |
| 2-ethylhexanol | | 2.0 | 2.0 | | | | | |
| Iso-octanol | 2.0 | | | 2.0 | 2.0 | 2.0 | 2.0 | |
| Iso-decanol | | | | | | | | 2.0 |
| Catalyst or accelerator | Polymer | Polymer | Polymer | Polymer | Polymer | Polymer | OGT-41 | Polymer |
| Acid No | 0.10 | 0.13 | 0.13 | 0.13 | 0.11 | 0.62 | 0.15 | |
| Saponification No | 331.0 | 318.2 | 315.2 | 328.2 | 320.9 | 314.2 | 319.7 | |
| K.V. at— | | | | | | | | |
| 210° F | 9.112 | 9.315 | 9.343 | 8.806 | 9.743 | 10.17 | 10.15 | 11.19 |
| 100° F | 50.10 | 51.49 | 51.95 | 47.70 | 53.92 | 56.27 | 57.38 | 72.74 |
| −40° F | 22,717 | | | 18,688 | 22,992 | 22,523 | | 44,432 |
| Micro flash | | | | | | 465 | 455 | 440 |
| Actual pour | | | | | | B−80 | | −70 |
| ASTM slope, 210 to −40° F | 0.624 | *.057 | *0.594 | 0.623 | 0.620 | 0.606 | *0.583 | 0.616 |
| Plexol 201 blend: | | | | | | | | |
| Percent complex | 82.0 | 80.0 | 80.0 | 85.0 | 76.0 | 73.0 | 74.0 | 65.0 |
| K.V. at— | | | | | | | | |
| 210° F | 7.558 | 7.520 | 7.580 | 7.604 | 7.607 | 7.453 | 7.542 | 7.566 |
| 100° F | 38.42 | 38.30 | 38.85 | 38.69 | 37.68 | 36.78 | 38.25 | 38.84 |
| −40° F | 12,740 | 11,642 | 11,683 | 12,793 | 10,978 | 10,529 | 11,122 | 12,086 |
| ASTM slope, 210 to −40° F | 0.631 | 0.628 | 0.627 | 0.630 | 0.625 | 0.627 | 0.627 | 0.631 |
| Diiso-octyl azelate blend: | | | | | | | | |
| Percent complex | 82.0 | | | 85.0 | 76.0 | 73.0 | | |
| K.V. at— | | | | | | | | |
| 210° F | 7.604 | | | 7.644 | 7.616 | 7.655 | | |
| 100° F | 38.63 | | | 38.78 | 37.70 | 37.76 | | |
| −40° F | 12,434 | | | 12,500 | 11,013 | 11,339 | | |
| ASTM slope, 210 to −40° F | 0.629 | | | 0.629 | 0.624 | 0.627 | | |

*ASTM slope, 210° F. to 100° F.

The superior viscosity characteristics of the complex ester prepared by the process of the invention allow it to be used as a thickening agent in the formulation of certain synthetic lubricants where they would not otherwise be useful. The complex esters of this invention also have been shown to have good heat stability when kept at a temperature of 547° F. for 10 hours under nitrogen.

We claim:

1. A blended synthetic lubricant characterized by a kinematic viscosity of at least about 7.5 centistokes at 210° F. and not exceeding about 13,000 centistokes at −40° F., consisting essentially of about 15 to 30 percent of a diester, of lubricating viscosity, of a $C_8$ to $C_{10}$ primary branched chain monohydric alcohol and a dicarboxylic acid selected from the group consisting of sebacic and azelaic acids, and about 70 to 85 percent of a complex ester produced by the steps of esterifying in the presence of a catalytic amount of a titanium compound, neopentyl glycol, a $C_8$ to $C_{10}$ primary branched chain monohydric alcohol and a dicarboxylic acid component consisting essentially of azelaic acid containing up to about 90% of sebacic acid as the essential esterifying constituents in the approximate proportions of one mole of glycol to two moles of alcohol to two moles of acid and stripping the reaction product at a temperature above about 175° C. and at an absolute pressure of up to about 25 mm. Hg.

2. The lubricant of claim 1 in which the diester is diisooctyl azelate.

3. The lubricant of claim 2 in which the complex ester acid component is azelaic acid.

4. A blended synthetic lubricant consisting essentially of 15 to 30 percent of diisooctyl azelate and about 70 to 85 percent of a complex ester produced by esterifying in the presence of a catalytic amount of a titanium compound, neopentyl glycol, a $C_8$ Oxo-alcohol and azelaic acid as the essential esterifying constituents in the approximate proportions of one mole of glycol to two moles of alcohol to two moles of acid, and stripping the reaction product at a temperature above about 175° C. and at an absolute pressure of up to about 25 mm. Hg, said lubricant being characterized by a kinematic viscosity of at least about 7.5 centistokes at 210° F. and not exceeding about 13,000 centistokes at −40° F.

References Cited by the Examiner

UNITED STATES PATENTS

| | | | |
|---|---|---|---|
| 2,499,984 | 3/50 | Beavers et al. | 252—56 |
| 2,624,754 | 1/53 | Blake | 260—485 |
| 2,647,099 | 7/53 | Smith | 260—485 XR |
| 2,798,083 | 7/57 | Bell et al. | 252—56 |
| 2,802,024 | 8/57 | Fasce et al. | 252—56 XR |
| 2,820,014 | 1/58 | Hartley et al. | 252—56 |
| 2,837,562 | 6/58 | Matuszak et al. | 260—485 |

FOREIGN PATENTS 789,459   1/58   Great Britain.

OTHER REFERENCES

Barnes et al.: "Synthetic Ester Lubricants," Lubrication Engineering, August 1957, pages 454–458 pertinent.

DANIEL E. WYMAN, *Primary Examiner.*

JULIUS GREENWALD, *Examiner.*